United States Patent [19]
Godbersen

[11] 3,743,269
[45] July 3, 1973

[54] IMPLEMENT ATTACHMENT
[76] Inventor: Byron L. Godbersen, 710 Circle Drive, Ida Grove, Iowa
[22] Filed: July 26, 1971
[21] Appl. No.: 166,163

[52] U.S. Cl. ............................. 267/164, 172/202
[51] Int. Cl. ............................................. F16f 1/16
[58] Field of Search ..................... 172/202; 267/164

[56] References Cited
UNITED STATES PATENTS
3,503,452  3/1970  Godbersen ......................... 172/202
3,566,974  3/1971  Kopaska ............................ 172/202

Primary Examiner—James B. Marbert
Attorney—Henderson & Strom

[57] ABSTRACT

A device for attaching an implement such as a harrow to a drawbar pulled by a tractor. A hairpin spring including two elongated sections connected by an arcuate section is adapted for mounting to an implement and to a drawbar. A restraining means is provided which limits the spread between the two elongated sections during use.

3 Claims, 6 Drawing Figures

Patented July 3, 1973

3,743,269

INVENTOR
BYRON L. GODBERSEN
BY
Henderson & Strom
ATTORNEYS

IMPLEMENT ATTACHMENT

BACKGROUND OF THE INVENTION

For many years the technique of combining a plowing operation and a harrowing operation into a single step has been practiced by providing an attachment for a harrow on a plow frame. As long ago as 1882 a device for this purpose was described in U.S. Pat. No. 267,247.

More recently, improved equipment for accomplishing this object has been developed which includes improved means for attaching a harrow to a plow frame or other structure pulled by a tractor. One of the most recent, and most successful, ways of attaching an implement to a pulling means is described in U.S. Pat. No. 3,503,452, and includes a plurality of flexible springs connected to the implement and mounted to a drawbar pulled by a tractor. While these prior art devices have been quite satisfactory in most respects, nevertheless certain disadvantages result from their use under certain circumstances. For example, the flexible spring attachment of U.S. Pat. No. 3,503,452 is a compromise between the desired flexibility during harrowing and the desired stiffness during times when the harrow is lifted out of contact with the ground, such as during turning or when transporting the harrow from one location to another.

SUMMARY OF THE INVENTION

This invention relates to an implement attachment, and more particularly to a device for attaching an implement such as a harrow to a drawbar pulled by a tractor.

In accordance with this invention, an implement such as a harrow is attached to one end of an elongated flexible section of a generally hairpin shaped spring, and the spring is mounted to a drawbar for pulling the implement. In actual practice, a plurality of hairpin shaped springs are utilized to provide satisfactory operation of the implement being pulled.

This invention provides an implement attachment structure which allows for one degree of flexibility during harrowing and another degree of flexibility during transportation or other instances when the implement is not in contact with the ground.

This is achieved by including a restraining means for limiting the separation of the two elongated sections of a hairpin shaped spring attached to the implement at one end of one of the elongated sections. The hairpin spring is mounted to a drawbar with the elongated sections of the spring extending toward the implement being pulled. Restraining means are provided fixed to an end of one of the elongated sections and adapted to prevent separation of the two elongated sections by more than a desired amount.

It is an object of this invention to provide an improved implement attachment device.

It is a further object to provide an implement attachment device which provides one degree of flexibility during operation of the implement and a different degree of flexibility during transportation of the implement.

These and other objects and advantages will be apparent from the following description of a preferred embodiment.

DESCRIPTION OF THE PREFERRED EMBODIMENT

Figure 1:
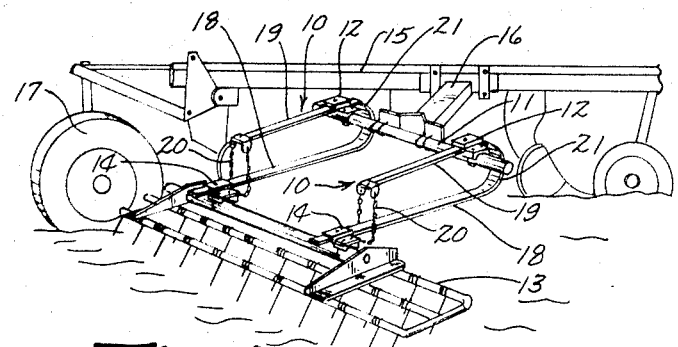
FIG. 1 is a perspective view showing a typical manner of using the invention.
Figure 2:
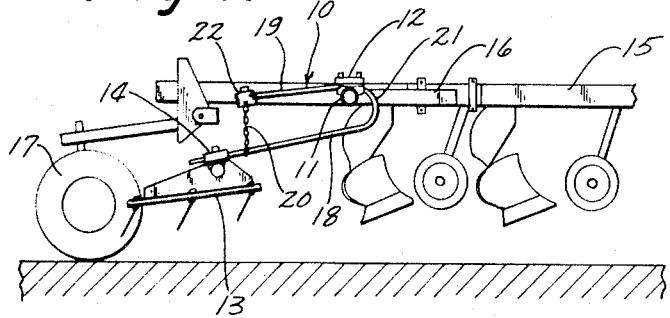
FIG. 2 is a side elevation showing the invention.

A typical application of this invention is illustrated in FIGS. 1 and 2, wherein implement attaching devices 10 are attached to a drawbar 11 by drawbar mounting clamps 12. The implement attaching devices 10 are shown fastened at their trailing ends to a spring tooth harrow 13 by harrow mounting clamps 14. The drawbar 11 is connected to a plow beam 15 by a shaft 16, and the plow can be converted to a raised, non-ground engaging position (FIG. 2) from a lowered operating position (FIG. 1) by adjustment of the wheel from a raised position (FIG. 1) to a lowered position (FIG. 2). This adjustable feature, along with the combination of a harrow attached to a plow beam and pulled by a tractor (not shown), is conventional and does not constitute a part of this invention.

As can be seen in FIG. 1, when the plow and harrow are in a lowered operating position, the harrow 13 is urged into the ground by the spring action of the first or lower elongated section 18 of device 10, and in turn the section 18 is urged upwardly by ground reaction with harrow 13, causing section 18 of device 10 to move toward second or upper elongated section 19 of device 10. As seen in FIG. 1, the lower section 18 is flexed upwardly so that it is out of contact with chain 20 extending from upper section 19 and looped around lower section 20. The result is that harrow 13 is urged into the ground only by that portion of device 10 extending from drawbar mounting clamp 12 to harrow mounting clamp 14, and the upper section 19 is effectively removed from operation during normal plowing and harrowing. It will be apparent that the amount of pressure put on the harrow 13 by attachment device 10 can be varied somewhat by adjusting the position of the drawbar mounting clamp 12 about the drawbar 11. Additional variation can be obtained by shifting the position of harrow mounting clamp 14 on lower section 18 as can be best seen in FIG. 3.

The raised position of plow beam 15 and harrow 13 is illustrated in FIG. 2, and this position would be utilized, for example, when transporting the equipment from field to field or sometimes during sharp turning of the tractor and equipment, thereby eliminating undesirable side loads on the equipment.

When harrow 13 is in the raised position, it can be seen that it would be solely supported by lower section 18 except that chain 20 prevents section 18 from spreading away from upper section 19, so that in order for harrow 13 to move lower than the position shown in FIG. 2, such as in response to bouncing of the plow beam 15, the resistance of upper spring section 19 as well as lower section 18 must be overcome. This arrangement provides for one degree of spring resistance during operation of harrow 13 and a second, greater degree of spring resistance during transportation of harrow 13. Without the additional spring resistance provided by upper section 19 and chain 20, the harrow 13 would tend to flex excessively during transportation, and damage to the harrow teeth would be likely. It is clear that something other than a chain, for example a rod or cable extending from lower section 18 through an opening in upper section 19 and having a stop means, could be used to give the same result. This alternative is not illustrated.

Figure 3:
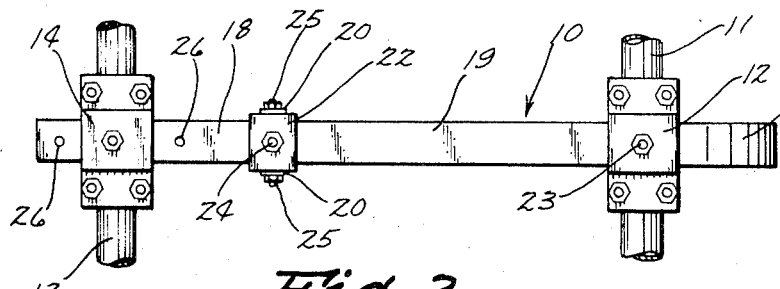
FIG. 3 is a top plan view of the invention and its mountings.
Figure 4:
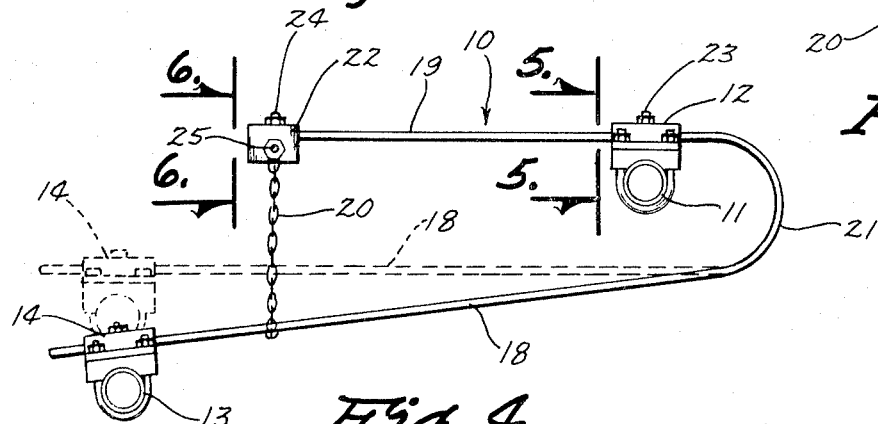
FIG. 4 is a side elevation of the invention and its mountings.

The attachment device 10 and associated mounting clamps are illustrated in more detail in FIGS. 3 - 6. In FIGS. 3 and 4, implement attachment device 10 is shown consisting of a hairpin shaped spring having a first or lower elongated section 18, a second or upper elongated section 19, and an intermediate arcuate section 21 joining the two elongated sections. Upper section 19 is shown (FIG. 3) overlying lower section 18, and a bracket 22 is bolted to upper section 19 and supports chain 20 at each side thereof. Chain 20 is looped below lower section 18 to limit the spread between upper section 19 and lower section 18 of the hairpin spring for the purpose recited above. A plurality of spaced holes 26 in lower section 18 are provided to allow varying flexibility due to greater or lesser effective length of section 18 according to which hole 26 is used to attach clamp 14.

Figure 5:
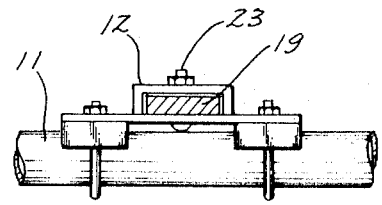
FIG. 5 is an enlarged elevational view taken along the lines 5—5 of FIG. 4.

Drawbar mounting clamp 12 attaches the upper section 19 of device 10 to the drawbar 11 as shown in FIG. 5. A bolt 23 extends through mating holes in upper section 19 and clamp 12, and clamp 12 is attached to drawbar 11 with conventional hardware. As seen in FIG. 5, the cross section of section 19 is rectangular, and this is the preferred cross sectional shape for the entire hairpin spring.

Figure 6:
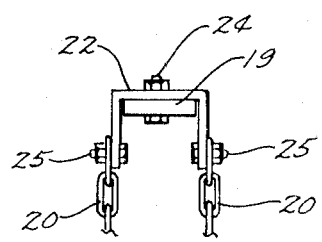
FIG. 6 is an enlarged elevational view taken along the lines 6—6 of FIG. 4.

FIG. 6 shows the arrangement for fastening chain 20 to chain bracket 22 which in turn is bolted to the end of elongated section 19 by bolt 24. Bolts 25 pass through bracket 22 and a link of chain 20, and it is apparent that the length of chain 20 can be varied as desired.

The hairpin spring is shown in full lines in its spread position in FIG. 4, corresponding to the transporting position as also shown in FIG. 2 wherein the lower section 18 of the hairpin spring is confined by chain 20. The normal or unstressed configuration of the hairpin spring is illustrated by broken lines in FIG. 4 wherein the upper and lower elongated sections 19 and 18 are generally parallel.

The operation of the device of this invention provides the desired flexibility during ground contact of the harrow 13 supported by the attaching device 10 and also provides for the desired firmness or stiffness of support when the harrow is in the raised or transporting position of FIG. 2, due to the action of chain 20 restraining the spread between elongated sections 18 and 19.

A preferred embodiment of the invention having been described, it will be apparent that variations and modifications thereto can be made without departing from the invention, which is to be defined by the appended claims.

I claim:

1. An implement attaching device comprising:
   a hairpin spring adapted for mounting to a drawbar including vertically spaced first and second elongated sections and an arcuate section joining said elongated sections;
   the first elongated section being adapted for mounting, near the end away from the arcuate section, to an implement; and
   restraining means interconnected between the second elongated section near the end away from the arcuate section and said first elongated section adjacent said end, and said restraining means adapted to limit the spread between said elongated sections.

2. The implement attaching device of claim 1 wherein said elongated sections are parallel and extend one over the other.

3. The implement attaching device of claim 2 wherein the hairpin spring is formed of spring steel and is of rectangular cross-section, and the restraining means is a chain detachably affixed to the second elongated section and looped around the first elongated section.

* * * * *